Aug. 14, 1934.   H. H. LURIE   1,970,012
WELDING TORCH
Filed Feb. 24, 1931
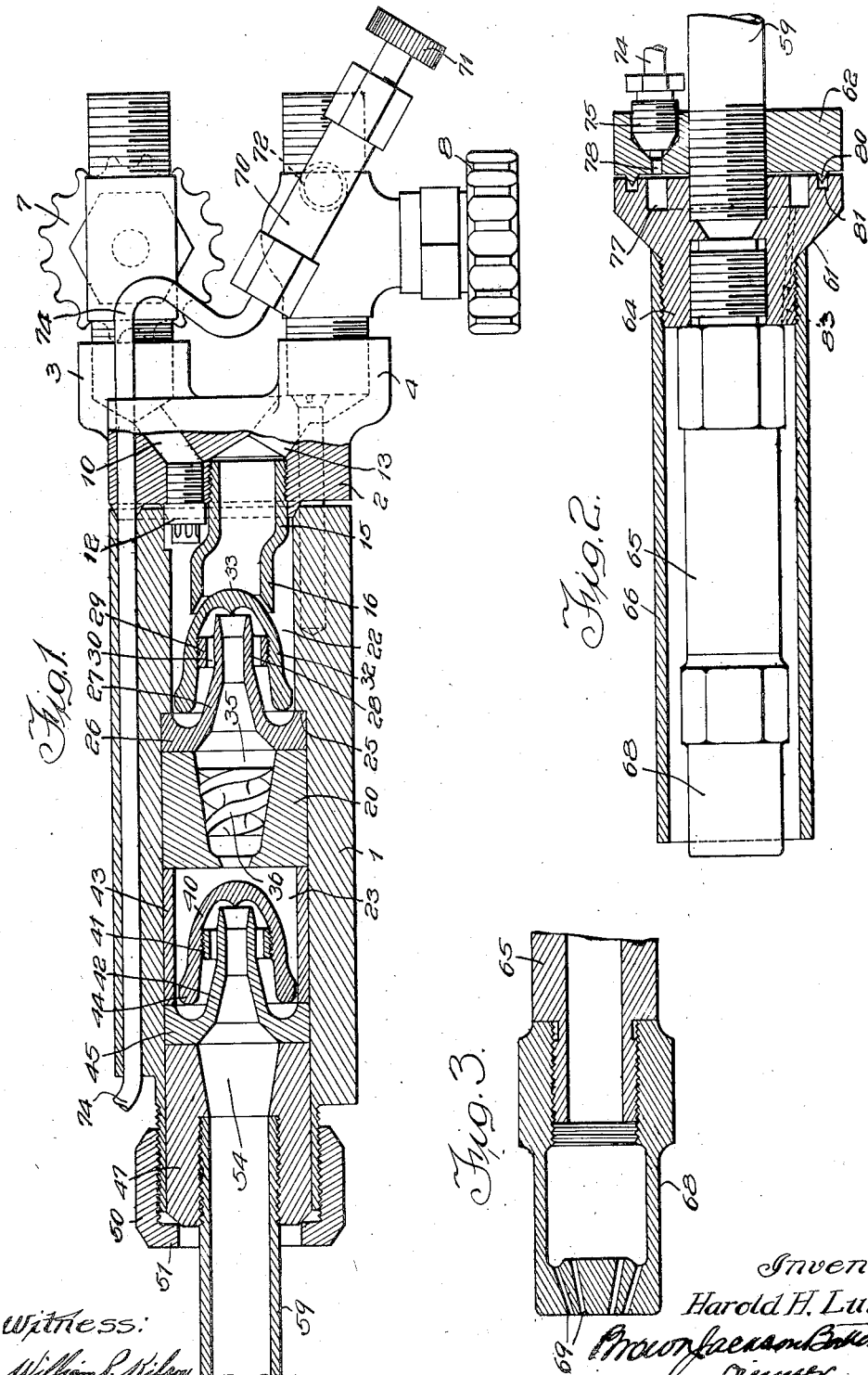

Patented Aug. 14, 1934

1,970,012

UNITED STATES PATENT OFFICE 1,970,012

WELDING TORCH

Harold H. Lurie, La Fayette, Ind., assignor, by mesne assignments, to Utilities Research Commission, Inc., Chicago, Ill., a corporation of Illinois Application February 24, 1931, Serial No. 517,686

9 Claims. (Cl. 158—27.4)

The present invention relates generally to the art and process of welding or cutting metals and the like by the application of intense heat which is usually obtained by the controlled combustion of one or more gases, this manner of fusing and uniting metals being commonly termed gas or flame welding.

The principal object of the present invention is the provision of means and methods providing an increased efficiency whereby in the process of gas welding a gas or gases of relatively low calorific value, such as ordinary or commercial illuminating gas, may be economically and efficiently employed.

It has long been sought to use commercial or ordinary illuminating gases and oxygen in autogenous welding. Commercial or ordinary city gas is universally available and inexpensive and no extra equipment such as drums, generators, tanks or the like are required, as is the case in the use of other combustibles. Up to the present time, however, efforts to employ city gas in a practical form have not been greatly successful. A considerable majority of the welding done at the present time is in connection with structural and other work employing wrought iron and steel. These particular materials have a relatively high fusing point and also a relatively high heat conductivity factor and in order to be successful illuminating gas welding must be practical with these metals. According to the present invention welds of wrought iron and steel are possible because of the exceedingly efficient use of the combustible by virtue of its thorough and intimate mixture with oxygen in the right proportion.

In autogenous welding or cutting it is practically essential to have a concentrated flame producing a zone of intensely high temperature. At the same time it is necessary to prevent the metals or the portions thereof subjected to the intense heat from being oxidized, particularly when iron and steel are being welded because these metals when heated to high temperatures have a great affinity for oxygen and readily combine with it to produce oxides, and it is also necessary to have sufficient heat to take care of losses due to the heat conductivity of the metals, which is relatively high in the case of such metals as wrought iron and steel. In order to reach the required temperature to effect fusion it is very essential to bring the low heat value combustible and the oxygen together in the proper manner and to have the combustible and the oxygen thoroughly and intimately mixed before combustion to avoid stratification of either the combustible or the oxygen. According to the present invention this mixing is accomplished in an improved and novel manner in small quantities within the handle of the torch by subjecting the gas streams to various reversals and changes in direction of flow and velocity.

Where gases of relatively high heating value, such as acetylene, propane, or butane are employed, enough heat is generated by only a partial decomposition to effect fusion. The gases resulting from the partial combustion or decomposition are principally carbon monoxide and hydrogen, and these gases, which surround the combustion zone, produce a reducing atmosphere which protects the heated metal and prevents the oxidation thereof by combining with the available oxygen in and surrounding the zone of operation. However, in welding with gases of low heat value, such as illuminating gas which consists primarily of carbon monoxide and hydrogen in various proportions, in the first place there are little or no constituents present which will yield a reducing product or establish a reducing atmosphere through partial combustion. In the second place, in order to produce a fusing temperature it is necessary to carry the combustion further in order to exhaust as much usable heat as possible from the gas to effect the fusion of metals, such as, for example mild steel and cast iron. In order, therefore, to establish a reducing atmosphere or blanket surrounding the welding zone when burning low heat value gases the present invention contemplates either or both of two steps effectively adapted to bring this condition about.

Two types of torches in use today are what are generally known as the low-pressure torch and the high pressure torch. In the former the oxygen is admitted under pressure and draws in the combustible under a lower pressure by aspiration after the general principle of the steam injector. In the latter or high pressure-type torch both gases are introduced at high pressure. The present invention is adapted to be embodied in either type of torch but for purposes of illustration the following description contemplates the low pressure type. In order to effectively use low heat value gases as the combustible and to secure a reducing atmosphere for the welding zone one of the steps of the present invention is the introduction of the combustible under pressure, either high or low, and causing the flow thereof to entrain the necessary oxygen. This is important in that the injecting gas tends to become excessive in the course of operation if the pressure varies or fluctuates and an excess of combustible over oxygen assures a reducing medium which acts to prevent oxidization of the fused metal and to conserve the heat in the high temperature or welding zone.

The second step is embodied in the feature of surrounding the welding flame with a sheath or mantle of unmixed or raw combustible gas, and this may be done either with or independently of the first step outlined above. Being somewhat deficient in oxygen this sheath or mantle of relatively slowly burning gas furnishes a reducing atmosphere around the rapidly burning admixture of combustible and oxygen which not only conserves the heat thereof and offsets heat losses by conductivity, but also prevents the molten or fused metal from being oxidized by the products of combustion, carbon dioxide and water vapor, in the welding blast, both of which attack molten steel, or by oxygen in the surrounding air. According to the present invention, preferably a portion of the raw or unmixed combustible with which oxygen is mixed to produce the welding flame is conducted directly to the space surrounding the welding zone by conduits establishing a shunt or by-pass around the mixing chamber. It is not necessary, and in some cases it may not even be desirable, that this auxiliary gas be the same or a similar gas to that used to effect the welding of the metals, but where it is possible the use of the same combustible makes for simplicity and economy.

The generic features of the present invention are briefly outlined above but it is to be understood that other and auxiliary features and advantages of the present invention will be apparent to those skilled in the art after a consideration of the following detailed description of one of the many possible structural embodiments, taken in conjunction with the accompanying drawing illustrating that embodiment and in which:

Figure 1 is a longitudinal cross section through a welding torch constructed and arranged to carry out the novel methods according to the present invention. Figure 1 particularly shows the means provided for securing a thorough and intimate mixture of the gases used in the welding operation;

Figure 2 is a view, partly in section and partly in elevation and illustrating the means provided for assuring a reducing atmosphere for the welding flame; and Figure 3 is an enlarged section through a preferred form of the welding tip.

Referring now more particularly to Figure 1, it will be observed that the principal or body portion of the torch comprises an elliptical member 1 which in actual operation may be used as the handle of the torch. The body member 1 is provided with interior bores or chambers and with means cooperating therewith for defining or establishing a mixing chamber to be described more in detail later.

The body portion 1 is adapted to be secured to and mounted upon an apertured gas receiving head 2 having connections 3 and 4 to which valve means 7 and 8 are respectively fixed. A port 10 communicates with the connection 3 at one end and with the interior of the mixing chamber or chambers formed interiorly of the body portion 1. A baffle plug 12 is interposed in the port 10 and serves to reduce the pressure of the entering oxygen by causing the high velocity oxygen to strike the baffles in the plug 12. A supply of oxygen is connected with and controlled by the valve 7.

The other connection 4 with its valve 8 is connected with a source of supply of combustible gas, which may be any gas of high heating value, such as acetylene, or any gas of relatively low heating value, such as ordinary city or illuminating gas. A port 13 in the head 2 leads from the connection 4 to nozzle 15 formed or threaded into the head 2. The nozzle 15 has a straight portion deflected laterally so that its axis substantially coincides with the general longitudinal axis of the mixing chamber and the body portion 1.

The body portion 1 carries substantially midway between the ends thereof a central wall or web 20 which divides the interior of the body portion into two sections or chambers 22 and 23. While I have referred to the casing 1 as containing a mixing chamber it is to be noted that the mixing chamber as a whole comprises a plurality of smaller sections or chambers. The section or chamber 22 is of a smaller diameter than the portion of the body member 1 in which the intermediate wall or web 20 is mounted, as will be clear by referring to Figure 1. This construction therefore provides a shoulder 25 against which is seated the base or flange 26 of a venturi 27. The throat 28 of the venturi carries a spider 29 having apertures 30 spaced around the throat portion 28. The spider 29 is exteriorly threaded to receive and mount a pointed member 32 in the form of a bell or conical thimble, the apex 33 of which occupies a position in axial alignment with the deflected portion 16 of the nozzle 15.

The outlet portion of the nozzle 15 has its walls formed to lie closely adjacent and substantially parallel with the exterior surface of the bell or conical member 32 near the apex 33 thereof. The larger or base portion of the bell 32 is of such a diameter as to closely approach but not touch the interior walls of the mixing chamber 22. A small or circumferential space is thereby provided which serves to provide a restriction acting to increase the velocity of gases flowing therethrough.

Immediately forward of the restriction just mentioned, the base portion 26 is formed to establish a gradually increasing orifice the walls of which are curved and which merge into or with the outer wall of the venturi 27. The upstream end of the Venturi throat 28 has its walls closely spaced with respect to the interior wall or surface of the bell 32, and at this point the interior wall of the bell 32 is curved around the upstream edge of the venturi to establish a smooth fluid flow.

The downstream end of the venturi 27 is enlarged in cross section and leads into the forward and larger end of a vortex chamber 35. The rear or downstream end of the vortex chamber 35 is reduced in cross section thus providing an approximately conical bore arranged to gradually increase the velocity of gases passing therethrough. Mounted in the vortex chamber 35 is a conically formed spiral insert 36 in the nature of a screw which imparts to the flowing gases a whirling or vortical motion.

A second bell or conical member 40 identical for all practical purposes with the bell 32 described above is mounted on the apertured flange or spider 41 on the venturi 42. A sleeve 43 is positioned in the larger chamber 23 and has one end in abutting relation with the central web or wall 20 and the other end abutting against the flange or base 45. A suitably formed and apertured bushing 47 is mounted within the body portion 1 and is adapted to contact with the base 45 of the venturi 42. This end of the body member 1 is threaded to receive a cap 50 thereon. The cap 50 carries an inwardly extending radial flange 51 which bears against the outer end of the bushing 47. Thus, when tightened, the cap 50 is adapted to hold the bushing 47, the venturi 42 with its base 45, the sleeve 43, the central wall 20, the flanged base 26 and the venturi 27 in place within the body member 1.

The interior diameter of the sleeve 43 is substantially the same as the interior diameter of the chamber or section 22. Since the bell or conical member 40 is identical with the bell 32, the larger or base portion 44 of the bell 40 approaches the interior walls of the sleeve 43 to establish a restricted opening for the gases so that the flow therethrough is increased in velocity. The base 45, downstream of the restriction just described, is formed to enlarge the cross section of the gas stream to decrease its velocity in a manner substantially identical with that described above in connection with the base 26 of the venturi 27.

Downstream of the venturi 42 the bushing 47 is bored to provide a chamber 54 of larger diameter so that the velocity of the flowing gases is reduced after passing through the venturi. The walls of this chamber 54 are formed to join and merge with the interior walls of the conduit or tubing 59 threaded or connected with the bushing 47. The tubing 59 is usually curved according to the use to which the torch is to be put and is of sufficient length to permit the operator to work in comfort.

The outer or discharge end of the tubing 59 is threaded into a cap 61. A locking plate 62 is provided and is adapted to secure the tubing 59 securely in the cap 61. The stem 64 of the cap 61 is provided with interior and exterior threads to receive respectively the coupling 65 and an exterior sleeve 66. The outer end of the coupling 65 is threaded and receives the welding tip proper, the latter being designated by the reference numeral 68.

As best shown in Figure 3, the welding tip 68 is formed with a series of openings 69 the axes of which are arranged in converging relation for the purpose of concentrating the flame or blast as near to a single point as possible. Tips of various kinds and sizes with openings 69 of various inclinations are provided according to the character of the work to be performed, the thickness of the metal, the conductivity, and other factors.

To produce a reducing atmosphere about the welding area, a portion of the unmixed or raw combustible gas is shunted or by-passed around the chamber 1 and is conducted to a point within the raw gas tube or sleeve 66 surrounding the coupling 65 and the welding tip 68.

The means I have provided for diverting or shunting a supply of raw or unmixed combustible gas to the welding zone includes a bleeder valve 70 controlled by a thumb screw 71 which is mounted on the gas valve 8 and is provided with a controlled port 72 in communication with the gas inlet or the valve 8. A tube or conduit 74 leads from the valve 70 through the head 2 and the body portion 1 to a bushing 75 threaded in the locking plate 62, as best shown in Figure 2. The cap 61 has an annular recess 77 formed therein with which, by means of a small port 78, the raw gas conduit 74 is in communication. In order to provide a tight joint between the locking plate 62 and the cap 61 and also to aid in holding these parts in proper position, the plate 62 carries an annular wedge shaped projection 80 constructed and arranged to engage a rectangular recess 81 in the cap 60. When the plate 62 and the cap 61 are tightened it will be readily seen that the ridge or groove 80 will be forced into gas tight relation with the small groove 81, thus preventing any leakage of the unmixed gas entering through the conduit 74.

The gas ring or groove 77 is in communication with the space between the sleeve or gas tube 66 by means of one or more small ports 83.

The operation of my improved welding torch is substantially as follows: The combustible under pressure, which may be high or low, according to the type of torch with which it is desired to incorporate the principles of my invention, enters the mixing chamber through the valve 8, the port 13 and the nozzle or delivery tube 15. The oxygen is admitted through the oxygen valve 7 and at a lower pressure than the combustible, the valves 7 and 8 being adjusted to secure the proper proportion. The oxygen passes through the port 10 and through the baffle plug 12 and into the first mixing chamber or section 22. One advantage of this arrangement is that dangerous flash backs are avoided because, even if the combustible gas is forced back inside the torch, it cannot get further than the reducing valve on the oxygen cylinder. On the other hand, considerable danger is often encountered in injector type torches when high pressure oxygen is used as the injecting medium, because if the tip becomes plugged by metal sputtering up from the weld, the high pressure oxygen is turned back inside of the torch and is forced into the combustible gas supply producing a highly explosive mixture. The combustible passes through the circumferential opening between the apex 33 of the bell 32 and the edge of the nozzle 15 at a relatively high velocity due to the small cross section of this opening. The bell 32 is shaped to spread or expand the incoming stream of combustible so that the latter moves over the surface of the bell 32 in a relatively thin layer until it reaches the restricted opening between the base of the bell 32 and the interior wall of the chamber 22. During the time that the combustible is spread out into a thin stratum the chamber 22 is filled with oxygen which thereby comes into intimate contact with the flow of combustible which entrains the oxygen not only by virtue of the extensive area in which the two gases are brought into contact but also because of the injecting effect upon the oxygen which the combustible exerts as it passes through the restricted opening between the apex or nose of the bell 32 and the nozzle 15 and the restriction between the base of the bell 32 and the closely spaced wall of the chamber 22, particularly the latter where the rapidly moving combustible draws a thin layer of oxygen with it in passing therethrough. Thus, even at the outset, the gases are substantially well mixed. The mixing and comingling of the two gases are further accelerated by virtue of the fact that as the combustible moves over and is expanded or spread out by the bell 32 the skin friction between the flowing gas and the stationary bell is of considerable magnitude and causes an appreciable amount of agitation of the particles of the combustible gas as the same is forced along the bell 32 and beyond the base thereof.

The two gases, now combined, emerge from the space between the base of the bell 32 and the wall of the mixing chamber and pass into the enlargement just beyond. By virtue of the increased cross section the velocity of the gases is now reduced and also the direction of flow thereof is reversed because the outer wall of the venturi 27 forces the gas flow to move along the inside of the bell 32 and through the openings 30 in the spider 29. At the same time, the construction of the venturi 27 and the bell 32 is such that the cross section of the gas stream is gradually reduced and hence the velocity is now increased, reaching a maximum for this stage at the point where the gases pass around the extreme upstream edge of the Venturi throat 28, and in so doing the gases experience a second reversal of flow.

As the gases emerge from the throat 28 of the venturi the cross section is materially increased where the venturi joins the vortex chamber 35. This causes the gases to have a relatively low velocity at the time they enter the spiral insert 36 which changes the direction of movement of the gas particles from a more or less linear or straight line movement to a motion having both linear and rotational components. By virtue of the conical shape of the vortex chamber 35 the velocity of the gases is gradually increased as they take up, to a greater extent, the whirling or vortical motion. Thus, by virtue of this construction the mixed gases enter the vortex chamber 35 at a relatively low velocity which is gradually increased both in its linear and angular components so that as the gases emerge from the vortex chamber and impinge on the nose or apex of the second bell or conical member 40 the gases are moving in a rapidly advancing whirl. Thus the particles of combustible and oxygen are tossed about one among the other so that a thorough mixture of the two gases is realized.

When the rapidly whirling gases strike the second bell 40 they are again spread out into a relatively thin stratum the agitation of which occurs to a greater extent than in the case of the first bell 32 because of the angular rotation of the gas particles superimposed upon their linear displacement. This causes the formation of eddy currents within the second mixing chamber 23 so that there is thorough intermingling of the two gases. The fluid flow is next directed through a restriction, that between the base 44 of the second bell 40 and the interior walls of the chamber 23, increasing the velocity of the flow and damping to some extent the vortical or whirling motion. Emerging from the last named restriction the gases are slowed up to a certain extent in passing around the base 44 of the bell 40, then the direction of flow thereof is again reversed and the velocity again increased in causing the gases to flow through the throat of the second venturi 42. As a final stage of the mixing operation the gases emerge into the large chamber 54 where the velocity is momentarily reduced until the gas enters the tube 59. It will thus be apparent that by the time the two gases will have reached the end of the chamber 54 they will have been thoroughly and intimately mixed, avoiding all stratification and securing uniformity of composition.

The mixed gases are directed through the tube 59 and through the coupling 65 into the welding tip 68 from which they emerge through the converging ducts 69. When ignited the resulting flame will be concentrated at a single point and will be uniform in character and efficient in heating value.

As stated above, where my improved welding torch is utilized with ordinary commercial or city gas as a combustible it may be desirable or necessary to provide a reducing atmosphere for the welding flame in order to prevent oxidization of the fused metal and to conserve the heat of the welding flame itself. According to the present invention this reducing atmosphere is obtained by bringing to the welding zone an independent supply of combustible gas which has not been mixed with any oxygen and which when caused to surround the welding flame and will burn with oxygen from the adjacent atmosphere which would otherwise be available to oxidize the fused metal. This sheath of burning combustible is also capable of acting as protecting means to prevent the escape of heat from the welding zone. This is an important feature of the present invention, particularly where combustibles of low heating value are utilized because in order to obtain a fusing temperature it is necessary to extract from the mixed combustible and oxygen as much usable heat as possible. According to the present invention the combustible utilized for this purpose is the same combustible with which the oxygen is combined, although other combustibles may be used. In operation, the bleeder valve 70 is adjusted by operating the set screw 71 to provide a supply of the raw or unmixed combustible. This flow of gas is conducted by the tube or conduit 74 around the mixing chamber 1 and into the annular gas ring 77 formed in the cap 61. The gas then passes through the port or ports 83 and into the sleeve 66 surrounding the tip 68. It will thus be seen that an enclosing cylindrical stratum of unmixed combustible gas is arranged to surround the welding flame emerging from the ducts 69 in the welding tip.

While I have shown and described the preferred structural embodiment of the present invention, together with the operation thereof and the essential features, it is to be understood that the present invention is not to be limited to the specific features shown and described, but that, in fact, widely different means may be employed in the practice of the broader aspects of the present invention. For example, it may be advantageous in some fields of application to entirely omit the second bell 40 and venturi 42 or replace it by another or other mixing devices and, while I have shown a torch particularly adapted for use with only one combustible and oxygen, namely, ordinary illuminating or city gas, it will be obvious that the invention may be utilized in connection with other combustibles, such as natural gas, acetylene, liquefied hydrocarbons and hydrogen, either separately or in varying proportions with each other and with oxygen or any other combustion supporting gas. It is also to be understood that the present invention may also be advantageously employed in such arts as brazing, soldering and the like.

What I claim, therefore, and desire to secure by Letters Patent is:

1. In the art of welding, brazing, and the like, employing a mixture of a combustible gas and a combustion supporting gas, the steps in the process of mixing the gases which include introducing the combustible gas into a mixing zone at a higher pressure than the combustion supporting gas, spreading the combustible gas into a thin generally conical jet, entraining the combustion supporting gas into the flow of the combustible, concentrating the flow of said gases, reversing the flow of the two gases and varying the velocity thereof, and imparting a spiral motion to the gas stream.

2. A welding torch for use in autogenous welding comprising separated gas conduits, means providing a mixing chamber in communication with said conduits to receive the gas flow therefrom, a nozzle for one of the conduits mounted in the mixing chamber, means adjacent the nozzle for restricting the outlet thereof and for spreading the entering gas into a thin stream, the other conduit being adapted to conduct a second gas into contact with the gas stream whereby the former entrains the latter, means in the chamber and cooperating with said last named means for reversing the direction of flow of the gas stream and increasing the velocity thereof, means for imparting a whirling motion to the gas stream, and means for conducting the mixture to the welding zone.

3. A welding torch for use in autogenous welding comprising separated gas conduits, means providing a mixing chamber in communication with said conduits to receive the gas flow therefrom, an approximately conical member mounted in said chamber with its apex arranged with respect to one of said conduits to restrict the flow therefrom and to spread the entering gas, a portion of said member approaching the walls of said chamber so as to provide a restriction for the flow of gas, the other conduit being arranged to bring a second gas into contact with the first gas as it is spread and passes through said restriction whereby the flow of one gas entrains the other, means for reversing the flow of said gases after they pass said restriction and collecting them into a solid stream, means for imparting a rotational movement to said stream and simultaneously varying its velocity, a second approximately conical member adapted to receive at its apex the stream as it emerges from said last named means and to spread the stream of gas, a portion of said second member also approaching the walls of the mixing chamber so as to establish a restriction for the flow of the gas stream, and means for reversing the flow of said gas stream and collecting the same into a stream of reduced cross section.

4. In a device for burning gases and the like, in combination, a burner, a mixing chamber, separate conduits for introducing a combustible gas and an oxygen-containing gas into said chamber, means comprising a hollow conical member for expanding one of said gases into a thin stream to present a large area to the other gas for entraining the same, means disposed at least partially within said hollow conical member for directing the entire stream of expanded and entrained gases backwardly into said hollow conical member to contract the stream and to increase its velocity, and means conducting said gases to said burner.

5. In a device for burning gases and the like, in combination, a burner, a mixing chamber, means for introducing a combustible gas and an oxygen-containing gas into said mixing chamber, means for expanding one of said gases into a thin stream to increase the available area thereof, means for introducing the other of said gases into said mixing chamber in contact with said stream to be entrained and mixed with said first gas, said gas expanding means serving to form said one gas into a thin, generally cylindrical stream, means disposed partially within said gas expanding means and serving to converge said thin generally cylindrical stream of gas backwardly into said gas expanding means as a generally cylindrical stream of smaller diameter, means associated therewith for reversing the direction of flow of said last named stream and for converting the same into a solid stream, and means conducting said mixed gases to said burner.

6. In a device for burning gases and the like, in combination, a burner, a mixing chamber, separate ducts for introducing a combustible and oxygen into said chamber, a substantially conical member having a hollow interior and a pointed end directed upstream with respect to said combustible for expanding the same into a thin stream to present a relatively large area to said oxygen for entraining the latter, means for directing the gas flow backwardly as a generally cylindrical stream into said hollow interior of the conical member to reverse the direction of flow, conduit means leading from the hollow interior of said conical member and arranged to converge said cylindrical stream into a solid stream to secure a thorough and intimate mixture of the gases, and means conducting the mixed gases to said burner.

7. A welding torch for use in autogenous welding comprising separated gas conduits, means providing a mixing chamber in communication with said conduits to receive the gas flow therefrom, an approximately conical member mounted in said chamber with its apex arranged with respect to one of said conduits to restrict the flow therefrom and to spread the entering gas, the other conduit being arranged to bring a second gas into contact with the first gas as it is spread whereby the flow of one gas entrains the other, means for reversing the flow of said gases after they pass said conical member, means for imparting a rotational movement to said stream and simultaneously varying its velocity, and means for conducting said mixed gases to the welding zone.

8. A mixing device for mixing a plurality of gases, comprising separated gas conduits, means providing a mixing chamber in connection with said conduits to receive the gas flow therefrom, a member opposed to the flow of one gas causing it to be spread into a thin stream at high velocity, which stream entrains the second gas or gases, means for plurally reversing the stream flow, means for imparting a rotating motion to the gases, means associated therewith and including a tapered helical passage for increasing the stream velocity, and a diverging chamber into which said passage leads to provide for expansion of the rotating gases.

9. A welding torch for use in autogenous welding comprising separated gas conduits, means providing a mixing chamber in communication with said conduits to receive the gas flow therefrom, an approximately conical member mounted in said chamber with its apex arranged with respect to one of said conduits to restrict the flow therefrom and to spread the entering gas, the base portion of said conical member cooperating with the walls of said mixing chamber to restrict the flow of the gas after it has been spread by the apex of said conical member, the other conduit being arranged to bring a second gas into contact with the first gas as it is spread whereby the flow of the first gas through said last restriction entrains the second gas, means for reversing the flow of said gases after they pass said conical member, means for imparting a rotational movement to said stream, and means for conducting said mixed gases to the welding zone.

HAROLD H. LURIE.